No. 859,072. PATENTED JULY 2, 1907.
E. KEMPSHALL.
TIRE.
APPLICATION FILED MAY 18, 1906.

Witnesses
R. B. Williams
Hoyt Cornwall

Inventor
E. Kempshall.
By
Jno. Imrie
Attorney

UNITED STATES PATENT OFFICE.

ELEAZER KEMPSHALL, OF BOSTON, MASSACHUSETTS, ASSIGNOR TO KEMPSHALL TIRE COMPANY, OF BOSTON, MASSACHUSETTS, A CORPORATION OF MAINE.

TIRE.

No. 859,072.

Specification of Letters Patent.

Patented July 2, 1907.

Application filed May 18, 1906. Serial No. 317,594.

*To all whom it may concern:*

Be it known that I, ELEAZER KEMPSHALL, a citizen of the United States, residing at Boston, in the county of Suffolk and State of Massachusetts, have invented certain new and useful Improvements in Tires, of which the following is a specification.

This invention relates to improvements in tires of the type set forth in my pending application filed March 22, 1906, Serial No. 307,430.

In the referred to application leather and rubber are used in the composition of the tire, but I find much more satisfactory results are obtainable by substituting gutta-percha for the leather. The gutta-percha more readily coöperates with the rubber during the vulcanizing process, and to a limited extent fuses with the rubber, producing a more homogeneous structure, at the same time permitting of its binding sufficiently with the rubber to provide the necessary strengthening and cushion effect in the tire structure.

In my application for patent filed May 8, 1906, Serial No. 315,808, I have shown and described a tire having a centrally disposed inflated tube to exert outward pressure, as against the inward pressure of the mold when vulcanizing the tire. In the organization of a tire constructed in accordance with the present invention this, or a similar feature is also employed, as it is essential in the production of a thoroughly high grade vulcanized tire.

The tire is made up of a series of transversely arranged, and preferably alternately disposed, sections of gutta-percha and rubber, the latter acting as the resilient agent, and the former the less resilient or reinforcing agent.

The invention will be described in the following specification, reference being had particularly to the accompanying drawing, in which—

Figure 1:
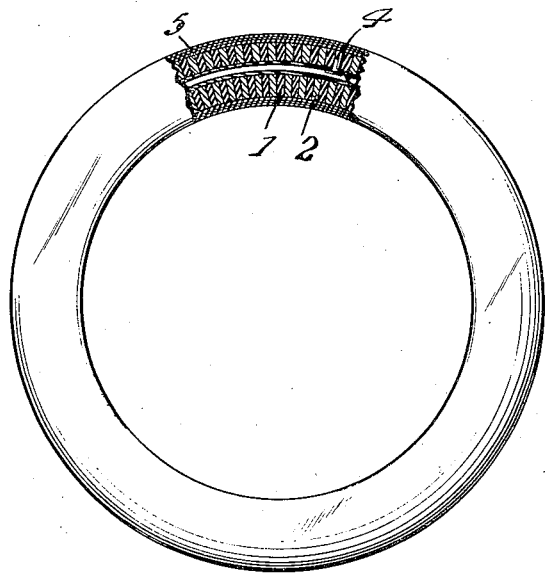
Figure 2:
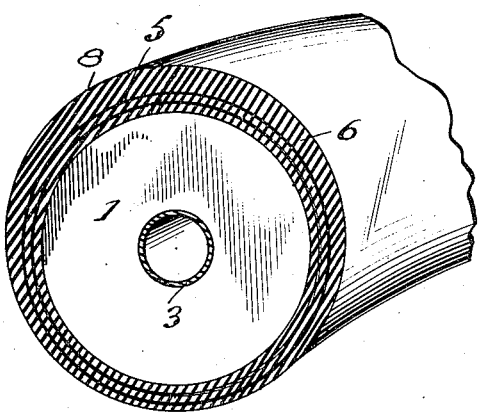
Figure 3:
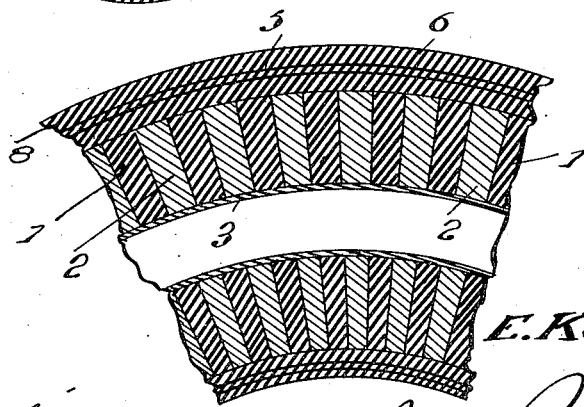

Figure 1 is a view of a tire, partially broken away to illustrate the invention. Fig. 2 is a detail perspective section of the tire. Fig. 3, is a detail vertical section of the tire.

Referring particularly to the drawings, my tire is constructed of a plurality of sections 1 and 2, arranged transversely of, and preferably alternately throughout the length of the tire. The sections 1, are composed of a relatively high resilient material, as rubber, while the sections 2, are composed of a material of less degree of resiliency, as gutta-percha, or the like. The sections are each provided with an opening 3, and conform in contour to the transverse curvature of the tire, and when assembled in tire form a circumferential tire is provided. The sections are strung on a deflated tube, which is afterwards inflated and the ends secured together and the valve 4, is embedded between two adjacent sections. After the sections are assembled and the tube is inflated to exert pressure toward their circumference, a cover 5, is applied. The cover is preferably composed of rubber 6, with interposed strips of fabric, for strengthening purposes, and is thickened to provide a tread portion 8.

After the cover is applied the tire as a whole is vulcanized, the rubber sections fusing with the cover, and the gutta-percha sections, while not fusing to the same degree as the rubber, is susceptible to the vulcanizing process and readily adheres to the cover and the adjacent rubber sections. The resilient tube is vulcanized to the walls of the openings 3, to prevent the sections slipping circumferentially. The sections are thus held together at their outer edges by the vulcanized cover, and interiorly by the vulcanized tube. As in the prior application, the function of the sections of resilient and less resilient material is to produce the necessary resiliency to cushion the tire, and a strengthening medium to assist the tire as a whole to "stand up". By reason of the adhesive characteristics of the two materials from which the sections are composed, coupled with the nature of the tire cover, the vulcanizing process makes a substantial, yet resilient, homogeneous structure, which is durable and yet may be cheaply constructed. The inner tube remains in the tire structure and aids to hold it together, and at the same time adds to the resilient qualities of the tire.

What I claim is—

1. A tire constructed of transversely arranged sections of rubber and gutta-percha, and a resilient cover, said cover being vulcanized to the outer edges of all the sections to bind the tire together.

2. A tire constructed of sections of rubber and gutta-percha, an inflated tube supporting said section and vulcanized thereto, and a resilient cover vulcanized to the entire outer edges of all the sections to bind the tire together.

3. A tire composed of transversely and alternately arranged sections of rubber and gutta-percha, an inflated tube supporting the sections and vulcanized thereto, a cover incasing the sections, said cover composed of rubber and fabric and vulcanized to the entire outer edges of all of the sections to bind the tire together.

4. A tire having in its construction sections of rubber and gutta-percha adjacent to and contacting with each other, and a rubber cover incasing the sections, the tire as a whole being vulcanized to fuse the rubber and gutta-percha sections together and to fuse the cover to the entire outer edges of all said sections.

In testimony whereof I have signed my name to this specification in the presence of two subscribing witnesses.

ELEAZER KEMPSHALL.

Witnesses:
CHAS. E. WESTERVELT,
F. L. MCKENNA.